United States Patent Office 2,740,819
Patented Apr. 3, 1956

2,740,819

PREPARATION OF 1-ISOPROPYL-2,4-DIMETHYLBENZENE

Earl Vance Kirkland, La Marque, Tex., assignor to The American Oil Company, a corporation of Texas No Drawing. Application June 22, 1954, Serial No. 438,635

2 Claims. (Cl. 260—668)

This invention relates to the alkylation of meta-xylene with propylene in the presence of an aluminum chloride catalyst. More particularly, the invention relates to the preparation of isopropylxylene mixture containing 1-isopropyl-2,4-dimethylbenzene as the predominant isomer.

At this time the indanes and the substituted indanes have become of interest as chemical intermediates and as plasticizers for polystyrene resins. One of the best ways of preparing these indanes is the high temperature catalytic treatment of an alkylbenzene containing a methyl group and an ethyl group or isopropyl group ortho to each other, i. e., 1-methyl-2-ethylbenzene or 1-methyl-2-isopropylbenzene. The indane product of 1-isopropyl-2,4-dimethylbenzene is of particular interest. In the normal alkylation reaction product mixture from the aluminum chloride catalyzed alkylation of xylene and propylene, the isopropylxylene fraction contains the 1-isopropyl-3,5-dimethylbenzene isomer as the predominant isomer and frequently this isomer represents as much as 90% of the isopropylxylene fraction.

An object of the invention is an alkylation process for the preparation of isopropylxylene wherein the 1-isopropyl-2,4-dimethylbenzene isomer is the predominant isomer. Another object is an aluminum chloride catalyzed alkylation reaction between meta-xylene and propylene to prepare an isopropylxylene fraction containing 1-isopropyl-2,4-dimethylbenzene as the predominant isomer. Other objects will become apparent in the course of the detailed description.

The process of this invention reacts liquid meta-xylene and propylene in the presence of aluminum chloride catalyst and water to produce an isopropylxylene fraction which contains 1-isopropyl-2,4-dimethylbenzene as the predominant isomer. Usually the water and xylene are added to the aluminum chloride catalyst before the introduction of the propylene. The amount of water present is substantially less than that amount required to hydrate the aluminum chloride to aluminum hydroxide.

The reactants in the process are propylene and meta-xylene. The meta-xylene is preferably substantially pure, but high purity meta-xylene containing not more than about 10 mol percent of the other $C_8$ isomers may also be utilized. The amount of propylene introduced relative to the meta-xylene present in the reaction zone is dependent upon the amount of the di-alkylate desired. When the mono-alkylate is preferred, to the substantial exclusion of the dialkylate, the mol ratio of propylene to meta-xylene is very small. In general, the mol ratio of propylene to meta-xylene should be between about 0.5 and 2. It is preferred to utilize a mol ratio of about 1.

At least a catalytic amount of substantially anhydrous aluminum chloride must be present in the reaction zone. The term "substantially anhydrous" is intended to include the commercial aluminum chloride which is sold as anhydrous grade. In general, the amount of aluminum chloride present will be between about 0.5 and 10 weight percent based on reactants. In the preferred mode of operation, between about 1 and 2 weight percent is utilized.

The reaction is modified to favor the formation of the 1-isopropyl-2,4-dimethylbenzene isomer by having present in the reaction zone water. Preferably, the water is introduced as a solution and/or dispersed in the meta-xylene prior to contacting the meta-xylene with the catalyst. However, the water may be added to a dispersion of the catalyst in the meta-xylene. In any event, the water is present in the reaction zone along with the meta-xylene and catalyst prior to the introduction of the propylene. The amount of water present is determined, in part, by the amount of the 1-isopropyl-2,4-dimethylbenzene isomer desired in the isopropylxylene product fraction. It is possible to obtain a product containing 60 mol percent or more of the desired isomer by operating with an amount of water that approaches the requirement for the complete hydration of the aluminum chloride but not entirely so. In general, the maximum shift of the isomeric product to the desired 1-isopropyl-2,4-dimethylbenzene isomer is obtained when sufficient water is present to hydrate at least about 75% of the aluminum chloride present. When the catalyst is present in an amount between about 1 and 2 weight percent, based on reactants, it is preferred to utilize between about 0.3 and about 0.8 weight percent of water, based on xylene, wherein the lower amounts of water correspond to the lower amounts of catalyst.

In general, the alkylation reaction is carried out at a temperature between about 20° C. and about 150° C., although somewhat higher or somewhat lower temperatures may be used. In all cases, sufficient pressure is maintained on the reaction zone to keep the met-xylene in the liquid state. In the preferred mode of operation, the alkylation reaction is carried out at a temperature between about 90° and about 100° C.

The propylene and meta-xylene reactants are contacted, in the presence of catalyst and water, for a time sufficient to substantially complete the reaction. This time will vary with the temperature, the amount of catalyst and the ratio of propylene to xylene. The time may vary from as little as 5 minutes to as much as 10 hours. In the preferred embodiment of the process, the reaction time is between about 1 hour and about 5 hours.

The results obtainable with the process of this invention are illustrated by the following working examples. In these examples, the aluminum chloride catalyst was introduced into a two-liter pot with the desired amount of xylene. The contents of the pot were heated to the desired reaction temperature and the contents agitated by means of a motor-driven stirrer. When the reaction temperature had been reached, propylene was introduced into the pot while the agitation was continued. At the completion of the propylene introduction, the agitation was continued at the desired temperature until the propylene was thought to have reacted. In the tests, commercial grade anhydrous aluminum chloride was utilized. Precautions were taken to avoid absorption of moisture from the atmosphere by the catalyst prior to use. High purity meta-xylene was used as the charge and was dried over calcium chloride prior to use. The reaction system was closed to the atmosphere but was vented to an exhaust line through a tower containing Drierite.

At the completion of the reaction, the pot was cooled to room temperature. Dilute hydrochloric acid was added to neutralize the aluminum chloride. The reaction product mixture was neutralized with dilute aqueous caustic and then water washed. The washed reaction product mixture was passed through Drierite, filtered and cut into various boiling range fractions by a laboratory distillation column. A fraction boiling between 135–150° C.

was xylene; that at 193–205° C. was isopropylxylene, and that at 230–240° C. was di-isopropylxylene. Hold-up in the column and pot bottoms were collected as bottoms. The various fractions were then analyzed by infrared technique for isomeric distribution.

In those runs wherein liquid water was present, the water was added to the dispersion of aluminum chloride and meta-xylene in the reaction pot.

The results of these tests are set out in Table I.

*Table I*

| Test No. | 1 | 2 | 3 | 4 |
|---|---|---|---|---|
| Time, hours | 5½ | 5¾ | 4¾ | 5 |
| Temperature, °C | 90–95 | 90–95 | 90–95 | 90–95 |
| Propylene/Xylene, mol ratio | 1.5 | 1.5 | 1.3 | 1.4 |
| AlCl₃ Catalyst, Wt. Percent | 1.6 | 1.6 | 1.6 | 1.6 |
| Water added, wt. percent of xylene charge | 0 | 0.06 | 0.3 | 0.5 |
| Product, wt. percent of xylene charge: | | | | |
| Xylene, B. P. 135–150° C | 0 | 1 | 11½ | 67 |
| Isopropylxylene, B. P. 193–205° | 70 | 62½ | 70 | 23 |
| Di-isopropylxylene, B. P. 230–245° | 56 | 51½ | 40 | 1 |
| Bottoms | 8½ | 11½ | 8 | 3 |
| Analysis, Isopropylxylene: | | | | |
| 1,2,4- | 1 | 6 | 32 | 64 |
| 1,3,5- | 91 | 92 | 66 | 34 |

In Test No. 1, no water was added to the reactor. All of the xylene was alkylated. The analysis of the isopropylxylene showed that 91% was the 1-isopropyl-3,5-dimethylbenzene isomer and hardly more than a trace was the desired 1-isopropyl-2,4-dimethylbenzene isomer. In Test No. 2 wherein about that amount of water soluble in the meta-xylene was added, the isopropylxylene fraction had increased markedly. In Test No. 3, wherein enough water was present to hydrolize about one-third of the aluminum chloride, the desired isomer had increased to about one-third of the isopropylxylene fraction. In Test No. 4, wherein the amount of water present was sufficient to hydrolize 72% of the catalyst, the desired isomer was about two-thirds of the isopropylxylene fraction. These data show that by the process of this invention, it is possible to prepare isopropylxylene by the alkylation of meta-xylene with propylene in the presence of aluminum chloride catalyst to obtain, an isopropylxylene fraction containing in excess of 60% of 1-isopropyl-2,4-dimethylbenzene.

Thus, having described the invention, what is claimed is:

1. The process for preparing 1-isopropyl-2,4-dimethylbenzene, which process comprises dispersing substantially anhydrous aluminum chloride in substantially pure liquid meta-xylene in a reaction zone, introducing propylene into said zone in a mol ratio of propylene to xylene of between about 0.5 and 2, maintaining said zone at a temperature between about 20° C. and about 150° C. at a pressure at least sufficient to hold said xylene in the liquid state, for a time sufficient to substantially complete the alkylation reaction, wherein liquid water is present with said xylene in an amount about 75% of that needed to hydrate said aluminum chloride, and said chloride is present in an amount between about 0.5 and 10 weight percent, based on reactants, and separating from the reaction product mixture an isopropylxylene fraction containing 1-isopropyl-2,4-dimethylbenzene as the predominant isomer.

2. A process for preparing 1-isopropyl-2,4-dimethylbenzene, which process comprises introducing substantially pure meta-xylene containing dispersed therein between about 0.3 and 0.8 weight percent, based on said xylene, of water into a reaction zone containing substantially anhydrous aluminum chloride catalyst and thereafter introducing propylene into said zone in a mol ratio of propylene to xylene of about 1, maintaining said zone at a temperature between about 90° and 100° C. for a time between about 1 hour and 5 hours and at a pressure sufficient to maintain said xylene in the liquid state, said catalyst being present in said zone in an amount between about 1 and 2 weight percent based on reactants and wherein the lower amounts of water correspond to the lower amounts of aluminum chloride, and separating from the reaction product mixture an isopropylxylene fraction containing at least about 60 mol percent of the 1-isopropyl-2,4-dimethylbenzene isomer.

References Cited in the file of this patent
UNITED STATES PATENTS 2,450,764    Myers _____ Oct. 5, 1948

OTHER REFERENCES

Thomas: "Anhydrous Aluminum Chloride in Organic Chemistry" (1941), pages 459–463, 867 and 868.